United States Patent
Bremer

[11] 3,904,340
[45] Sept. 9, 1975

[54] DIE-HEAD
[75] Inventor: Allen R. Bremer, Seattle, Wash.
[73] Assignee: Taiga Industries, Inc., San Diego, Calif.
[22] Filed: Jan. 28, 1974
[21] Appl. No.: 436,842

[52] U.S. Cl. .............................................. 425/297
[51] Int. Cl.² ........................ B28B 7/14; B28B 13/00
[58] Field of Search ................... 425/296, 297, 306

[56] References Cited
UNITED STATES PATENTS
2,224,212  12/1940  Bowling ............................ 425/297

*Primary Examiner*—Francis S. Husar
*Assistant Examiner*—R. J. Charvat

[57] ABSTRACT

This invention is directed to an improvement in die-heads and molds which are used in briquetting machines or presses for molding cylindrical briquettes from fibrous particles such as: wood particles, sawdust, wood shavings, paper, wood chips, and other fibrous materials. The die-head and the die for the briquette make it possible to achieve a briquette having a more uniform cross-sectional density and also a briquette of higher density than could be realized with prior briquetting machinery.

29 Claims, 9 Drawing Figures

DIE-HEAD

BACKGROUND OF THE INVENTION

One of the basic techniques for making cylindrical briquettes has been disclosed by R. T. Bowling in his U.S. Letters Pat. Nos. 1,906,245, issuing date of May 2, 1933; No. 1,990,631, issuing date of Feb. 12, 1935; and, No. 2,224,212, issuing date of Dec. 10, 1940.

In forming cylindrical briquettes, finely commuted fibrous material is fed from a hopper to a tapered feed screw which is suitably enclosed within a conical drum having at its forward end a compression chamber. As the screw turns, a pressure upon the material is gradually increased in proportion to the taper of the feed screw and it is laid in the first compression chamber partly compressed with relation to the finished product. Secured to the forward end of the tapered feed screw and revolving therewith is a die-head. The die-head picks up the partly compressed laminated material in the first compression chamber and passes it into the second compression chamber where it is laid up in relatively thin laminations under great pressures to form a solid, cylindrical briquette. The second compression chamber comprises a cylindrical die supported in a revolvable mold wheel. A multiplicity of these dies are spaced around the periphery of the mold wheel and register successively with the feed and the conical drum adjacent the die-head. The pressed material as it leaves the die-head is laid in the hollow, cylindrical mold or second compression chamber in a continuous spiral layer of a width equal to the radius of the die-head which is, of course, one-half the diameter thereof and of the cylindrical mold.

In operation each die is presented at the feed end of the conical drum with a form and cooled briquette therein. When the mold is properly indexed, a yieldable pressure head is brought into abutment with the end of the briquette remote from the feed end of the die. As the tapered feed screw and die-head begins to revolve and extrude the thin laminations of the product into the die or mold, the yielding head is permitted to back away, proportionately and permit the finished briquette to be extruded from the die. The pressure maintained on the yielding head is, approximately, forty thousand to fifty thousand pounds per square inch; and this pressure, together with the action of the feed screw and the die-head compresses the laminations of the fibrous material, being produced, against each other.

The combination of pressure and friction produces great heat and the saps, resins, pitches and other moisture present in the fibrous material are converted into a semi-fluid which thoroughly binds the fibers together when cooled. With the heat developed upon compression of the fibrous material making the briquette, there is an increase in temperature in the briquette. The moisture in the briquette, naturally, tends to vaporize and upon taking the briquette out of the mold the briquette will explode and disintegrate. Therefore, it is necessary that the fibrous material have a, relatively, low moisture content in the range of about 8 percent moisture or less. Also, it is necessary to cool the mold so as to cool the briquette and to lower the temperature in the briquette to lessen the possibility of an explosion of the briquette upon taking the briquette, while still warm, from the mold. It is my understanding that considerable research has been devoted to using fibrous material having, relatively, high moisture content, greater than 8 percent, in the making of briquettes. Unfortunately, the making of the briquettes from wood particles with this, relatively, high moisture content has not been successful. Therefore, in the prior art it has been necessary to lower the moisture content of the fibrous particles to a value of about 8 percent or less in order to realize a briquette which can be removed from the mold without exploding.

Further, with the equipment as described by R. T. Bowling, the briquette was not of a uniform cross-sectional density, but was of a variable uniform cross-sectional density. I believe that one of the reasons for this variable cross-sectional density was that the flow of the fibrous material to the cylindrical mold by the die-head was not uniform and also that means were not provided to, uniformly, distribute the fibrous material into the mold.

BRIEF DESCRIPTION OF THE INVENTION

This invention is directed to a die-head and to a chamber in which the fibrous material is compressed to make a briquette. The die-head is of such construction that is feeds the material into the chamber more, uniformly, than previously, available die-heads. This assists in the making of a briquette of a more uniform density. Further, it assists in the making of a briquette more dense than previously available briquettes. Further, the die-head has means for distributing the material fed into the mold so that the material is more evenly distributed in the mold. A further important object is the positive circulation of a clean fluid in the die-head so as to have the die-head operate at a lower temperature than previously available die-heads. This means that the die-head is not subjected to the wear associated with the advanced temperature and also it means that the die-head can cool the spiral layer of the material being fed into the mold. Further, there is a positive circulation of the coolant or a cooling fluid around the mold so as to cool the briquette being formed in the mold. In addition, the coolant or a cooling fluid is at a lower temperature than previously available cooling fluids. This means that the briquette leaves the mold at a lower temperature than previously available briquettes and, therefore, it is possible to use fibrous material having a higher moisture content of about 10 percent moisture as contrasted with an 8 percent moisture content for previous fibrous materials being formed into the briquette.

An object of this invention is to provide a briquette of a more uniform cross-sectional density than the previously available briquettes had; to provide a more dense briquette than was previously available; to provide a slower burning briquette, because of the greater density, than was available with prior briquettes; to provide a briquette with more potential energy in a given volume of the briquette or to provide a briquette with more potential heat energy in a given volume of a briquette than was previously available; to provide a more rapid production rate than was previously available with other die-heads and molds; to provide a die-head which performs at a lower temperature than previously available die-heads performed so as to have a longer useful life; to provide a die-head with a positive circulation of a coolant or a cooling fluid through the die-head; to provide an apparatus and a method making it possible to use fibrous particles having a higher moisture content than previously used fibrous particles for making a briquette; to provide an apparatus and method for making a lower cost briquette than was previously available; and, to provide a means and a method to cause less wear on the die-head because of a lower operating temperature than was previously available.

These and other important objects and advantages of the invention can be more particularly brought forth upon reference to the detailed description of the invention, the appended claims and the accompanying drawings.

DETAILED DESCRIPTION OF THE INVENTION

Figure 7:
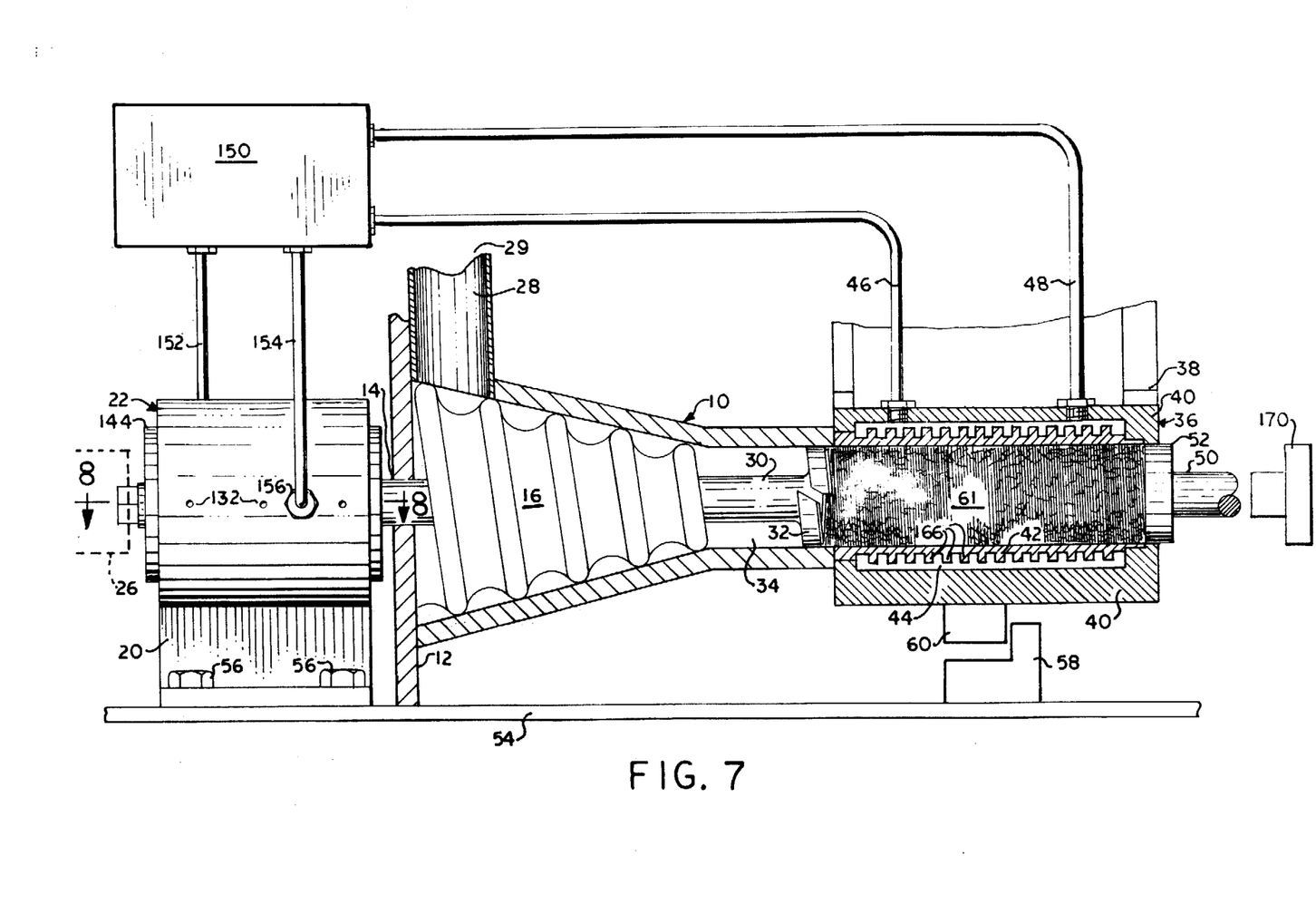
FIG. 7 illustrates the mold or the briquette, the cooling chamber around the mold, the die-head, the spindle, the tapered feed screw, the cooling apparatus and the connections to the spindle and to the jacket around the mold or the circulating coolant.

With reference to the drawings and, in particular, to FIG. 7, I have shown a tapered or a conical drum 10. On the large end of the conical drum 10 is a cover plate 12 having a passageway 14. In the tapered or conical drum 10 is a feed screw 16 which is revolved by means of a shaft 30.

There is a pillow block 20 which supports a combination bearing and coolant feed means 22. The shaft 30 is supported in bearings 24 of said combination bearing and coolant means 22. A power means 26, such as a moter connects with the shaft 30 for rotating the shaft 30 and the feed screw 16.

In the tapered or conical drum 10, the upper enlarged part of the left, see FIG. 7, there is an opening or passageway 28. A feed hopper 29 connects with this opening or passageway 28 and also with the interior of the tapered drum 10 and to the feed screw 16.

On the forward end of the feed screw 16 is a shaft 30. The forward end of the shaft 30 is the die-head 32.

The small end of the tapered or conical drum 10 connects with a compression chamber 34. The shaft 30 and the die-head 32 are in the compression chamber 34.

A cylindrical die or mold 36 is registered with the feed end of the tapered or conical drum 10 and is supported in a rotary mold wheel 38 having an outer cylindrical member 40 and an inner rim 42. A cylindrical passage 44 formed between the members 40 and 42 and a coolant is introduced into this volume and removed from this volume by means of tubes 46 and 48.

A piston stem 50 supports a yielding head 52.

There is a support plate 54. The pillow block 20 is attached to support plate 54 by means of bolts 56. On the support plate 54 is a pressure shoe 58.

An index ring 60 around the outer periphery mold wheel 38 registers the pressure shoe 58 to hold the dies 36 and the wheel 38 in proper alignment.

In FIG. 7 I show a, substantially, complete briquette, as reference numeral 61, in the cylindrical die or mold 36.

Figure 1:
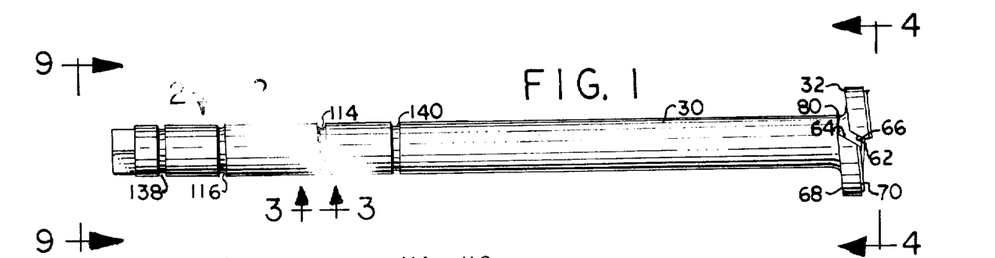
FIG. 1 is a view of the combined die-head and spindle.

In FIG. 1 it is seen that the die-head 32 is mounted on the shaft 30. In effect, the die-head 32 comprises a portion of a thread and has the slot 62, the bounds of which are formed by the inclined wall 64 and an opposed wall 66.

Figures 2, 3, 4, 5:
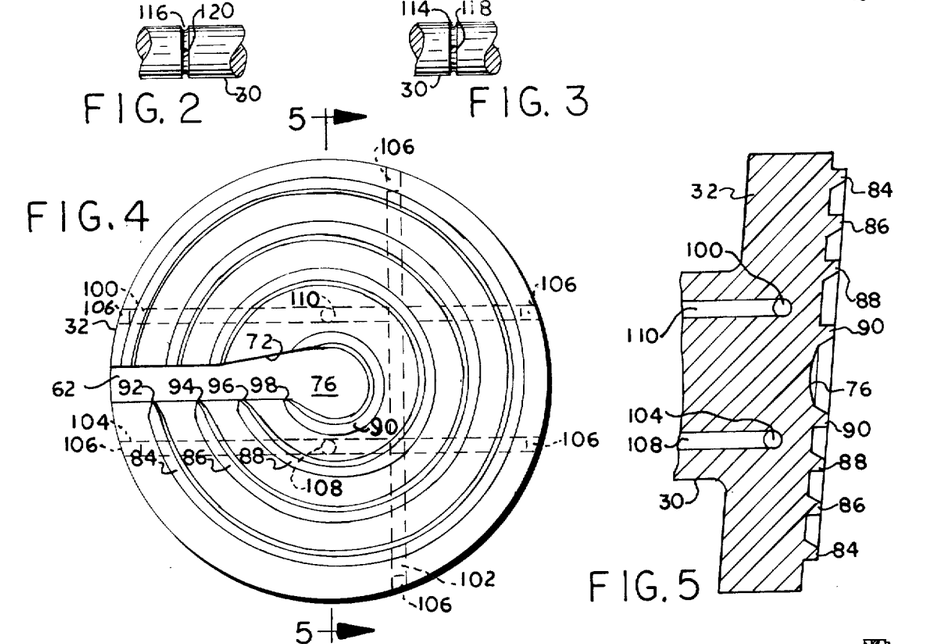
FIG. 2, taken on line 2—2 of FIG. 1, is a view looking at a groove and a passageway in the spindle for the circulation of a coolant.
FIG. 3, taken on line 3—3 of FIG. 1, is a view of a groove and a passageway in the spindle for a coolant.
FIG. 4 is a view looking at the front face of the die-head and illustrates the transfer screw and the ribs on the front face of the die-head, and, also illustrates, in phantom line the cooling passages in the die-head for the flow of coolant.
FIG. 5, taken on line 5—5 of FIG. 4, is a transfer diametrical sectional view illustrating the die-head, the ribs on the front face of the die-head, and the cooling passageways in the die-head.

The slot 62 runs from the back spiral face 68 to the front spiral face 70. The slot 62, as is seen in FIG. 4, extends, inwardly, from the periphery of the die-head 32 to the approximate periphery of the spindle 30 at the back of the die-head 32 or the bac spiral face 68. It is seen that the slot 62 widens at 72 ar the center of the die-head 32. In other words, the c iter part of the slot 62 is narrower than the inner part. The reason for this is that a quantity of fibrous material can be introduced nearer the center of the die-head 32 with the wider slot 72 so as to make a more dense briquette 61.

The opposed walls 64 and 66 may be parallel or slightly diverging from the back spiral 68 to the front spiral face 70. The inclined wall 64 merges away from the wall 66 as it approaches the front spiral face 70. The inclined wall 64 merges into the inclined depression 76 of arcuate shape in the front that spiral face 70 of the die-head 32. At the back face of the die-head 32 the inclined wall 64 terminates in a cutting edge 80 which extends in a radial direction from the periphery of the head to the periphery of the spindle and behind this cutting edge the back spiral face 68 of the head declined until it reaches into the depression 82 at the opposite side of the mouth or the entrance to the slot 62.

The inclined depression 76 merges into the front spiral face 70 of the die-head 32 and is, substantially, spiral in configuration.

With respect to FIGS. 4 and 5, it is seen that on the front spiral face 70 of the die-head 32, there are a plurality of ribs 84, 86, 88 and 90. These ribs may be tapered or rounded as desired. Also, each of these ribs has a leading edge such as rib 84 has a leading edge 92, rib 86 has a leading edge 94, rib 88 has a leading edge 96 and rib 90 has a leading edge 98.

The rib 90 is of the smallest diameter and is closest to the center and is in the configuration of a decreasing spiral so that upon the rotation of the die-head 32, the leading edge cuts into the fibrous mass and tends to force the fibrous mass into the more central part of the briquette 61 which is being formed. The rib 90 in conjunction with the wide slot 72 or the wide throat 72 of the slot 62 functions to force more of the fibrous mass into the more central portion or interior of the briquette 61 being formed. This is accomplished by means of the decreasing spiral of the rib 90. The ribs 88, 86, and 84 are of, successively, of increasing diameters. Also, these ribs are of an increasing spiral so that with the fibrous mass introduced through the slot 62, the ribs tend to expand this fibrous mass outwardly from the center of the briquette 61 being formed. The result of the ribs 90, 88, 86 and 84 in conjunction with the slot 62 and the wide inner throat 72 of the slot 62 is to more evenly distribute the fibrous mass over the cross-section of the briquette 61 being formed and thereby achieve a more uniform distribution of the fibrous mass in the briquette and to realize a more uniform cross-sectional density of the briquette. Further, this means that the briquette will be more dense than could be realized with prior apparatus and available methods. With the more dense briquette, there is more potential energy to be released upon burning the briquette. Further, a more dense briquette burns slower and, therefore, for a longer period of time.

Figure 6:
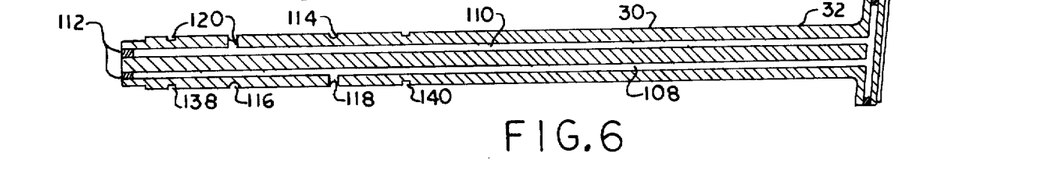
FIG. 6, is a longitudinal cross-sectional view of the die-head and the spindle and illustrates the grooves in the die-head and the spindle for the circulating coolant.

The die-head 32 has through passageways for the flow of a coolant. In FIGS. 4 and 5 it is seen that there is a passageway 100, a passageway 102 and a passageway 104. The passageways 100, 102 and 104 allow the coolant to flow in the die-head. The passageways 100, 102 and 104 may be drilled into the die-head 32 and must be plugged at 106. The die-head 32 is integral with the shaft or spindle 30. In FIG. 6 it is seen that in this shaft or spindle 30, there are two longitudinal passageways 108 and 110. The passageway 108 may connect with the passageway 100 and the passageway 110 may connect with the passageway 104. The passageways 108 and 110, as is seen in FIG. 6, are plugged by plugs 112.

In FIG. 6 it is seen that on that end of the spindle 30 away from the die-head 32 there is a circular groove 114 and a circular groove 116. The circular groove 114 connects by means of a passageway 118 with the passageway 108. The circular groove 116 by means of a passageway 120 connects with the passageway 110.

Figure 8:
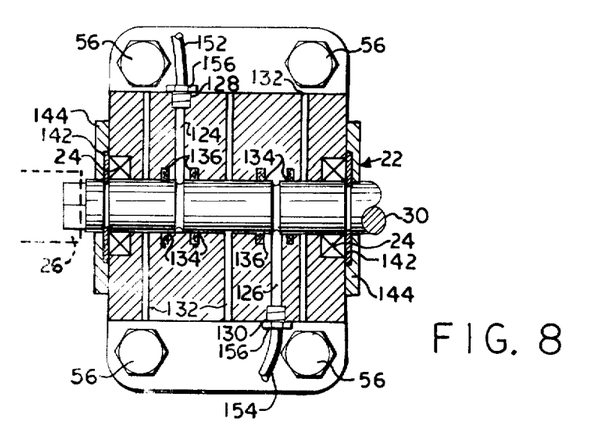
FIG. 8, taken on line 8—8 of FIG. 7, is a cross-sectional view illustrating the structure for connecting the cooling pipes to the spindle for the circulation of a coolant.
Figure 9:
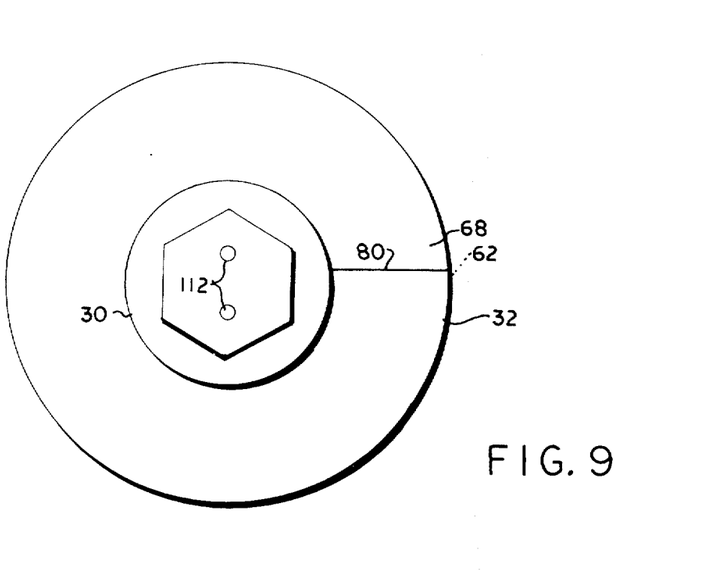
FIG. 9, taken on line 9—9 of FIG. 7, is a cross-sectional view looking at the back face of the die-head and illustrates the passageways in the spindle for the coolant.

In FIG. 8 there is illustrated the bearing and coolant means 22. The means 22 comprises a right circular cylinder having a longitudinal passageway 122 which cofits with the shaft 30. In the means 22 is first passageway 124 and a second passageway 126. Means 22 at the entrance of the passageway 124 is tapped at 128 and means 22 at the entrance of the passageway 126 is tapped at 130.

There are a plurality of passageways 132 running from the exterior surface of the means 22 to the passageway 122 and which passageways 132 function as an air vent.

On each side of the passageway 124 and on each side of the passageway 126 are circular recesses 134 in the means 22. Recesses 134 are for receiving seals 136.

In the shaft 30, and spaced-apart from an outside of the grooves 120 and 118 are two grooves 138 and 140.

In the grooves 138 and 140 and outside of the means 22 are snap rings 142 for positioning the means 22 on the shaft 30. There may be a cover plate 144 on the ends of the means 22 and for covering the snap rings 142 and the ends of the means 22.

In FIG. 7 there is illustrated a coolant means. The coolant means 150 can comprise a means for cooling a cooling fluid and also a means for forcing or pumping the cooling fluid to the appropriate places. The coolant means, for example, can comprise a refrigeration means for cooling water to a temperature close to 32°F. or 0°C. or a means for cooling other liquids such as an alcohol and solid carbon dioxide bath. A solid carbon dioxide and ethyl alcohol bath has a temperature of approximately −72°C. There are other suitable cooling fluids such as a mixture of solid carbon dioxide and acetone. The dry ice and alcohol or dry ice and acetone mixture can be used and the cold liquid alcohol or the cold liquid acetone can be pumped to the appropriate place where it is warmed and, possibly, vaporized, and then returned to 154 for further cooling.

In FIGS. 7 and 8 it is seen that a pipe 152 and a pipe 154 connect with the means 22 so, for example, the pipe 152 can connect with a fitting 156 in the tapped passageway 124 and the pipe 154 can connect with the fitting 156 in the tapped passageway 126. The cooling liquid, or cooling fluid, can be introduced by means of the pipe 152, the passageway 120, the passageway 110 and the spindle 30 to the pasageways 88, 100 and 104 in the die-head 32 and then returned through the passageway 108, the passageway 118 and the tube 154 to the coolant means 150. In this manner the die-head 32 is maintained at a low temperature so as to decrease the wear on the die-head 32. As is well known the die-head 32 wears more at a high temperature when in the process of compressing the fibrous mass in the mold or cylindrical die 36. The coolant means 150 by means of tubes 46 and 48 connect with the outer cylindrical member 40 of the cylindrical dye or mold 36. In the outer cylindrical member 40 are two tapped passageways 160. There are fittings 162 in these two tapped passageways 160 for connecting the tubes 46 and 48 to the outer cylindrical member 40 and for introducing fluid into the cylindrical passage 44 between the outer cylindrical member 40 and the inner rim 42.

In FIG. 7 it is seen that there are a plurality of spaced apart ribs 166 on the inner rim 42 and which ribs 166 are for cooling purposes.

The tube 46 may be considered to be the inlet tube to the cylindrical passage 44, and the tube 48 may be considered to be the return tube from the cylindrical passage 44. The coolant means 150 may flow or force a coolant or a fluid such as acetone cooled with dry ice or alcohol cooled with dry ice or cold water or other suitable cooling material through the inlet pipe 46, into the cylindrical passage 44 and around the inner rim 42 and then through the exit tube 48 and back to the coolant means 150.

In FIG. 7 it is seen that there is a motor or a power means 26 connecting with the shaft 30 for rotating the shaft 30 and the feed screw 16. Also, it is seen that there is a hydraulic or pneumatic cylinder 170 connecting with the ram 50 for exerting pressure on the briquette 61 which is being formed in the cylindrical die or mold 36. This hydraulic cylinder or fluid actuated cylinder 170 may exert a pressure in the range of 40,000 to 50,000 pounds per square inch so as to make sure that the fibrous particles are compressed in the cylindrical die or mold 36 to make the briquette 61.

In the operation of the apparatus to form briquettes, the loose fibrous particles such as sawdust, wood chips, and other small particles of cellulose base material are fed through the feed hopper 29 and are gradually compressed by the screw 16 into the chamber 10 to the rear of the die-head 32. The fibrous particles in this chamber are in the form of relatively thick, loose laminations, and of course have a hollow in the center where it is formed around the spindle 30. The constantly revolving die-head 32 passes or conveys the loose laminations from the chamber through the slot 62 in the form of a ribbon, and the layer or ribbon is continuously "laid" in the second compression chamber or mold chamber 36.

In the mold chamber 36 the material is compressed to a greater density than in the first compression chamber 34, and this density may be varied by modifying the pressures upon the yielding head 52 offered by the longitudinal movable piston stem 50 and the fluid actuated cylinder 170. The cutting edge 80 of the die-head 32 severs the loose layers or laminations in a continuous spiral ribbon. The depression 74 on the front spiral face of the die-head 32 rises to the cam face and terminates at its juncture with a radial edge or wall of the slot. It will be apparent that the spiral face and the front spiral face of the die-head 32 comprises a portion of a single screw thread with a slot at 62 therethrough for the passage of the material from the conical chamber 10 to the cylindrical die or mold 36. Also, the front spiral face of the die-head 32 compresses the spiral ribbon against the briquette 61 which is already present in the mold cylinder 9 and also against the yielding head 52 thereby forming a new briquette immediately to the rear of the previously formed and already cooled briquette.

By the addition of the corrugations or ribs or spiral rings 84, 86, 88 and 90, to the front spiral face of the die-head 32, it is possible to distort the cross-sectional shape of the ribbon after it has passed through the slot 62 to a corrugated shape and cross-section. Further, it is possible by the declining radius of the spiral rib 90 to distribute the material passing through the slot 62 to the center of the briquette 61, which briquette 61 is being formed, so as to have a briquette with a more uniform cross-sectional density. In addition, with these spiralling ribs 84, 86, 88 and 90, it is possible to realize a briquette with a more uniform cross-sectional density and a density which is greater than has previously been achieved for briquettes. Also, the transverse screw 62 with the Y-opening 72 near the center of the die-head 32 makes it possible to introduce more of the material from the chamber 10 into the chamber 36 and thereby assist in realizing a briquette of more uniform cross-sectional density and a briquette which is more dense than previously obtainable briquettes.

As previously stated, other parties who have made briquettes from compressed wood particles have used a wood particle have a moisture content of about 8 percent or less. The reason for this is that the wood particle upon being compressed develops considerable heat when compressed into the form of the briquette. If the moisture content is too great upon the the briquette leaving the mold, the moisture in the briquette will expand, possibly, vaporize and disintegrate the briquette. With my invention and improvements the wood particles may have a moisture content in the range of about 10 percent to 12 percent as the briquette is cooled to a lower temperature in the cylindrical die or mold 36 and therefore the briquette upon leaving the die 36 is at a lower temperature and the moisture is not, likely, to be in the vapor form but will be in the liquid form. It is to be realized that with the die-head 32 feeding the partially compressed material to the cylindrical die or mold 36 that considerable heat is developed in the briquette 61 and in the mold 36 because of the compression of the wood particles. This compression of the wood particles makes it possible to bind together the wood particles and also for some of the sap, resins and other materials in the wood particle to liquify and flow so as to, upon solidifying, bind together the wood particles in the briquette. As is seen in FIG. 7 the inner rim 42 has a number of circular ribs 166 and, also, the die-head 32 is cooled by a flowing coolant. This means that the periphery of the briquette 61 being formed in the mold 36 is being cooled and also that the die-head 32 is being cooled and some of the material being introduced into the mold 36 is being cooled. Nevertheless, the pressure generated in the die mold 36 is considerable, in the range of 40,000 to 50,000 pounds per square inch, and the temperature developed by the wood particles upon being compressed into the briquette 61 becomes quite high. Because the circumference or the skin of the briquette 61 being formed is cooled to a low temperature by a mixture of ethyl alcohol or alcohol and carbon dioxide, to a temperature of about −72°C., the skin of the briquette is chilled and the moisture in the skin is in the liquid form and, relatively, cool. With the passage of the briquette through the mold 36 the skin of the briquette becomes cool although the interior may be relatively warm. A person may visualize that that part of the briquette near the die-head 32 is relatively cool. Then, that part of the briquette in the center of the mold 36 is quite warm, epecially, in the center of the briquette. That part of the briquette near the yielding head 52 is relatively cool due to the cooling of the periphery of the briquette 61 and also the heat transfer from the interior of the briquette 61 to the skin of the briquette 61. There is, definitely, a definite differential in the temperature in the briquette. That part of the briquette near the skin of the briquette is quite cool. The interior of the briquette in the center of the mold 36 is quite warm so that the resins and other materials flow in the briquette to bond the particles into one large unit. That part of the briquette near the yielding head 52 is quite cool, both on the skin and in the center. That part of the briquette near the die-head 32, both in the center and in the skin is, relatively, cool. As a result, the moisture in the interior of the briquette is in a liquid form and upon the briquette being released from the mold 36 the briquette will not disintegrate and explode. This makes it possible to use a wood particle of a, relatively, high moisture content at 10 percent to 12 percent as contrasted with what previous parties used in the range of 8 percent or less moisture. As a result, it is less expensive to make this briquette than the briquettes made by other parties, as a higher moisture content wood particle can be used, and it is not necessary to dry the wood particle to as low a moisture content.

From the foregoing, it is seen that I have provided a means for making a briquette, out of cellulose particles that are wood particles and which briquette has a high density and a uniform cross-sectional density. There is provided a die-head having a positive cooling means for cooling the die-head so as to have a longer life than a die-head that is not cooled with a positively circulating fluid is previously, explained, the die-head is subjected to a, relatively, high temperature and because of this high temperature does not have a long life. With my cooling means, the temperature of the die-head is a low temperature and therefore the life of the die-head is longer than previously available die-heads. Further, this die-head makes it possible to cut a spiral layer from a previously formed mass of fibrous particles or wood particles in the tapered or conical drum 12 and in the compression chamber 34. The feed screw 16 takes the fibrous particles or cellulose particles from the feed hopper 29 and compresses them and runs them through the tapered or conical drum 10 into the compression chamber 34. In the compression chamber 34 the die-head cuts a spiral layer from the mass material in the compression chamber 34 and introduces it into the cylindrical die or mold 36. The compression of the fibrous particles or wood particles or cellulose particles in the cylindrical die or mold 36 generates considerable heat. If the moisture content is in the range of 10 percent to 12 percent there is a possibility of the moisture becoming gaseoud or becoming steam and upon the briquette 61 being released from the mold 36 the steam will expand and explode the briquette. With my imporvement, the inner rim 42 in which the briquette 61 is formed is cooled to a low temperature so that the skin or the outer portion of the briquette 61 is cool. With the heat transfer inside of the briquette, the moisture remains in the liquid form and will, with the briquette being released from the mold 36, not expand and explode or disintegrate the briquette. Further, because of the low temperature surrounding the inner rim 42, the briquette is cooled sufficiently to allow a rapid production of briquettes. For example, with previously existing machinery for making briquettes, the residence time of a briquette in a cylindrical mold was such that a briquette would be made every, approximately, 30 seconds. With my equipment, it is possible because of the low temperature surrounding the inner rim 42 for a briquette to be made, approximately, every 15 or 20 seconds. As is seen, there is a considerable saving in time, and a faster production of briquettes from a given machine.

In order to have a greater cooling of the briquette in the rim 42 it may be desirable for the tube 48 to be the tube for introducing the coolant into the cylindrical passage 44 and for the tube 46 to be the exit tube for taking the warm coolant or warm liquid from the cylindrical passage 44 and returning to the coolant means 150. With the tube 48 being the entrance tube and the tube 46 being the exit tube, there is a counter current flow of coolant with respect to the inner rim 42 and therefore the cold or coolant will contact that part of the briquette to be released, first, from the cylindrical mold 36. In effect, with a counter current flow of the coolant such as a mixture of alcohol and dry ice or alcohol which has been cooled by dry ice, the outer skin of the briquette leaving the cylindrical mold 36 will be sufficiently cold so that the inner core of the briquette will be cool and the moisture in the briquette will be in the liquid form and not the vapor form. Again, as a result of this, it is possible to use a fibrous particle or a cellulose particle or a wood particle having a higher moisture content, in the range of 10 percent to 12 percent moisture content than other briquetting machines could use. As previously stated, other briquetting machines had to use a wood particle or a cellulose particle having a moisture content in the range of 8 percent or less. Further, the spiral ribs on the front spiral face of the die-head make it possible to have a more uniform distribution of the wood particles or fibrous particles in the mold 36 and therefore achieve a more uniform density briquette and also to achieve a briquette of higher density than previously available briquettes and therefore a slower burning briquette and also a briquette with more available wood or fibrous particles for burning.

From the preceding explanation of my invention and what I consider to be my improvements, I claim:

1. A rotary die-head for a briquette machine, said rotary die-head comprising:
   a. front and back spiral faces;
   b. means for cutting a spiral layer from a previously formed mass;
   c. said die-head having a transverse groove between said front and back spiral faces for passing said layer from the back sprial face to the front spiral face upon rotation of the die head;
   d. means for compressing said spiral layer into a solid cylindrical briquette;
   e. said transverse groove running from, approximately, the center of said faces to the periphery of said faces; and,
   f. said groove being wider at the interior of said faces than at the periphery of said faces to make a briquette of a, substantially, uniform cross-sectional density.

2. A rotary die-head according to claim 1 and comprising:
   a. said transverse groove at, approximately, the center of the front face being of a, generally, circular configuration.

3. A rotary die-head according to claim 1 and comprising:
   a. means on the front spiral face for corrugating material to be compressed into said briquette.

4. A rotary die-head according to claim 3 and comprising:
   a. said means on the front spiral face being a plurality of ribs.

5. A rotary die-head according to claim 4 and comprising:
   a. said ribs comprising an inner rib and an outer rib;
   b. said inner rib having a leading edge and being in a spiral configuration of a decreasing radius from the leading edge; and,
   c. said outer rib having a leading edge and being in a spiral configuration of an increasing radius from the leading edge.

6. A rotary die-head according to claim 4 and comprising:
   a. said ribs comprising a first inner rib and second, third and fourth outer ribs;
   b. each of said second, third and fourth outer ribs being of different radii;
   c. said inner rib having a leading edge and being in a spiral configuration of a decreasing radius from the leading edge; and,
   d. each of said second, third and fourth outer ribs having a leading edge and being in a spiral configuration of an increasing radius from the leading edge.

7. A rotary die-head according to claim 1 and comprising:
   a. a passageway in the die-head to allow the flow of a cooling fluid.

8. A rotary die-head according to claim 2 and comprising:

a. a passageway in the die-head to allow the flow of a cooling fluid.

9. A rotary die-head according to claim 4 and comprising:
   a. a passageway in the die-head to allow the flow of a cooling fluid.

10. A rotary die-head according to claim 5 and comprising:
    a. a passageway in the die-head to allow the flow of a cooling fluid.

11. A rotary die-head according to claim 1 and comprising:
    a. a spindle for securing said die-head to rotating means;
    b. two passageways in said spindle for the flow of a cooling fluid;
    c. a passageway in the die-head to allow the flow of a cooling fluid;
    d. said two passageways in said spindle and said passageway in the die-head connecting with each other; and,
    e. a means to flow a cooling fluid through said passageways.

12. A rotary die-head according to claim 11 and comprising:
    a. said transverse groove at, approximately, the center of the front face being of a, generally, circular configuration.

13. A rotary die-head according to claim 11 and comprising:
    a. said means on the front spiral face being a plurality of ribs.

14. A rotary die-head according to claim 11 and comprising:
    a. said ribs comprising an inner rib and an outer rib;
    b. said inner rib having a leading edge and being in a spiral configuration of a decreasing radius from the leading edge; and,
    c. said outer rib having a leading edge and being in a spiral configuration of an increasing radius from the leading edge.

15. A rotary die-head for a briquette machine, said rotary die-head comprising:
    a. front and back spiral faces;
    b. means on the front spiral face for corrugating material to be compressed into said briquette;
    c. said means on the front spiral face being a plurality of ribs;
    d. said ribs comprising an inner rib and an outer rib;
    e. said inner rib having a leading edge and being in a spiral configuration of a decreasing radius from the leading edge; and,
    f. said outer rib having a leading edge and being in a spiral configuration of an increasing radius from the leading edge.

16. A rotary die-head according to claim 15 and comprising:
    a. said ribs comprising a first inner rib and second, third and fourth outer ribs;
    b. each of said second, third and fourth outer ribs being of different radii;
    c. said inner rib having a leading edge and being in a spiral configuration of a decreasing radius from the leading edge; and,
    d. each of said second, third and fourth outer ribs having a leading edge and being in a spiral configuration of an increasing radius from the leading edge.

17. A rotary die-head according to claim 15 and comprising:
    a. a passageway in the die-head to allow the flow of a cooling fluid.

18. A rotary die-head according to claim 15 and comprising:
    a. a spindle for securing said die-head to rotating means;
    b. two passageways in said spindle for the flow of a cooling fluid;
    c. a passageway in the die-head to allow the flow of a cooling fluid;
    d. said two passageways in said spindle and said passageway in the die-head connecting with each other; and,
    e. a means to flow a cooling fluid through said passageways.

19. An improvement in a machine for making solid cylindrical briquettes, said machine comprising a rotary die-head having front and back spiral faces, means for cutting a spiral layer from a, previously, formed mass, said die-head having a transverse groove between said faces for passing said layer from the back spiral face to the front spiral face upon rotation of the die-head, and means for compressing said spiral layer into said solid cylindrical briquette, said improvement comprising:
    a. said transverse groove running from, approximately, the center of said faces to the periphery of said faces; and,
    b. said groove being wider at the interior of said faces than at the periphery of said faces to make a briquette of a, substantially, uniform cross-sectional density.

20. An improvement in a machine for making solid cylindrical briquettes according to claim 19 and comprising:
    a. said transverse groove at, approximately, the center of the front face being of a, generally, circular configuration.

21. An improvement in a machine for making solid cylindrical briquettes according to claim 19 and comprising:
    a. a means on the front spiral face for corrugating material to be compressed into said briquette.

22. An improvement in a machine for making solid cylindrical briquettes according to claim 21 and comprising:
    a. said means on the front spiral face being a plurality of ribs;
    b. said ribs comprising an inner rib and an outer rib;
    c. said inner rib having a leading edge and being in a spiral configuration of a decreasing radius from the leading edge; and,
    d. said outer rib having a leading edge and being in a spiral configuration of an increasing radius from the leading edge.

23. An improvement in a machine for making solid cylindrical briquettes according to claim 19 and comprising:
    a. a passageway in the die-head to allow the flow of a cooling fluid.

24. An improvement in a machine for making solid cylindrical briquettes according to claim 23 and comprising:

a. a spindle for securing said die-head to rotating means;
b. two passageways in said spindle for the flow of a cooling fluid;
c. a passageway in the die-head to allow the flow of a cooling fluid;
d. said two passageways in said spindle and said passageway in the die-head connecting with each other; and,
e. a means to flow a cooling fluid through said passageways.

25. An improvement in a machine for making solid cylindrical briquettes according to claim 22 and comprising:
a. a passageway in the die-head to allow the flow of a cooling fluid.

26. An improvement in a machine for making solid cylindrical briquettes according to claim 25 and comprising:
a. a spindle for securing said die-head to rotating means;
b. two passageways in said spindle for the flow of a cooling fluid;
c. a passageway in the die-head to allow the flow of a cooling fluid;
d. said two passageways in said spindle and said passageway in the die-head connecting with each other; and,
e. a means to flow a cooling fluid through said passageways.

27. An improvement in a machine for making solid cylindrical briquettes, said machine comprising a rotary die-head having front and back spiral faces, means for cutting a spiral layer from a, previously, formed mass, said die-head having a transverse groove between said faces for passing said layer from the back spiral face to the front spiral face upon rotation of the die-head, and means for compressing said spiral layer into said solid cylindrical briquette, said improvement comprising:
a. means on the front spiral face for corrugating material to be compressed into said briquette;
b. said means on the front spiral face being a plurality of ribs;
c. said ribs comprising an inner rib and an outer rib;
d. said inner rib having a leading edge and being in a spiral configuration of a decreasing radius from the leading edge; and,
e. said outer rib having a leading edge and being in a spiral configuration of an increasing radius from the leading edge.

28. An improvement in a machine according to claim 27 and comprising:
a. a passageway in the die-head to allow the flow of a cooling fluid.

29. An improvement in a machine according to claim 28 and comprising:
a. a spindle for securing said die-head to rotating means;
b. two passageways in said spindle for the low of a cooling fluid;
c. a passageway in the die-head to allow the flow of a cooling fluid;
d. said two passageways in said spindle and said passageway in each die-head connecting with each other; and,
e. a means to flow a cooling fluid through said passageways.

* * * * *